United States Patent
Nishiyama

(10) Patent No.: US 10,110,759 B2
(45) Date of Patent: Oct. 23, 2018

(54) IMAGE PROCESSING APPARATUS, CONTROL METHOD THEREOF, AND STORAGE MEDIUM FOR SETTING A TRANSMISSION DESTINATION

(71) Applicant: CANON KABUSHIKI KAISHA, Tokyo (JP)

(72) Inventor: Masashi Nishiyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/896,230

(22) Filed: May 16, 2013

(65) Prior Publication Data

US 2013/0308167 A1 Nov. 21, 2013

(30) Foreign Application Priority Data

May 21, 2012 (JP) ................. 2012-115758

(51) Int. Cl.
*H04N 1/00* (2006.01)
*H04N 1/44* (2006.01)
*H04L 12/58* (2006.01)

(52) U.S. Cl.
CPC ......... *H04N 1/00209* (2013.01); *H04L 51/24* (2013.01); *H04N 1/00225* (2013.01); *H04N 1/4413* (2013.01); *H04N 1/4433* (2013.01); *H04N 2201/0094* (2013.01); *H04N 2201/3218* (2013.01)

(58) Field of Classification Search
CPC .......... H04N 1/00212; H04N 1/00209; H04N 2201/3208; H04N 2201/0017; H04N 1/00214; H04N 1/32422; H04L 51/30; G06F 11/0784

USPC ....... 358/1.15, 405; 709/242; 714/18, 48, 49
See application file for complete search history.

(56) References Cited

U.S. PATENT DOCUMENTS

| 8,218,736 B1* | 7/2012 | McClintock | H04M 1/642 |
| | | | 379/88.12 |
| 2005/0195425 A1* | 9/2005 | Bridges | H04N 1/00212 |
| | | | 358/1.15 |
| 2006/0248153 A1 | 11/2006 | Hejza Litwiller | |
| 2007/0011254 A1* | 1/2007 | Otake | 709/206 |

(Continued)

FOREIGN PATENT DOCUMENTS

| CN | 1662032 A | 8/2005 |
| CN | 101489012 A | 7/2009 |

(Continued)

*Primary Examiner* — Jamares Q Washington
(74) *Attorney, Agent, or Firm* — Canon U.S.A., Inc. IP Division

(57) ABSTRACT

An image processing apparatus includes an acceptance unit configured to accept an input of user information, an acquisition unit configured to acquire an e-mail address of a user identified based on the user information accepted by the acceptance unit, a first setting unit configured to set a destination of a first e-mail transmitted with an attachment of image data, a second setting unit configured to set a destination of a second e-mail for making notification of completion of transmission of the first e-mail, and a control unit configured to perform control such that a destination of the first e-mail is restricted to the e-mail address acquired by the acquisition unit, but a destination of the second e-mail is not restricted to the e-mail address acquired by the acquisition unit.

7 Claims, 13 Drawing Sheets

(56) References Cited

U.S. PATENT DOCUMENTS

2009/0187758 A1* 7/2009 Fujii .................... G06F 21/608
 713/153
2013/0194632 A1* 8/2013 Kishimoto ................ G06F 3/12
 358/1.15

FOREIGN PATENT DOCUMENTS

| EP | 1912424 A1 | 4/2008 |
|----|---|---|
| JP | 2004192562 A | 7/2004 |
| JP | 2005-198072 A | 7/2005 |
| JP | 2006-101484 A | 4/2006 |
| JP | 2006-343862 A | 12/2006 |
| JP | 2009-100200 A | 5/2009 |
| JP | 2009-188694 A | 8/2009 |
| JP | 2010-520520 A | 6/2010 |
| JP | 6184060 B2 | 8/2017 |
| KR | 20070010707 A | 1/2007 |
| KR | 10-0979330 B1 | 8/2010 |
| KR | 10-2011-0076816 A | 7/2011 |
| WO | 2008107299 A1 | 9/2008 |

* cited by examiner

FIG. 6

| ADDRESS BOOK | | |
|---|---|---|
| 601 | 602 | 603 |
| TYPE | NAME | ADDRESS |
| E-MAIL | User A | user_a@xxx.com |
| FACSIMILE | User B | 03-1234-5678 |
| E-MAIL | User C | user_c@xxx.com |
| E-MAIL | User D | user_d@xxx.com |
| FILE | User E | server1abc.co.jp |
| FILE | User F | server2abc.co.jp |
| FACSIMILE | User G | 03-1234-9999 |

| ADDRESS BOOK | | |
|---|---|---|
| TYPE (601) | NAME (602) | ADDRESS (603) |
| E-MAIL | User A | user_a@xxx.com |
| E-MAIL | User C | user_c@xxx.com |
| E-MAIL | User D | user_d@xxx.com |

OK ~604

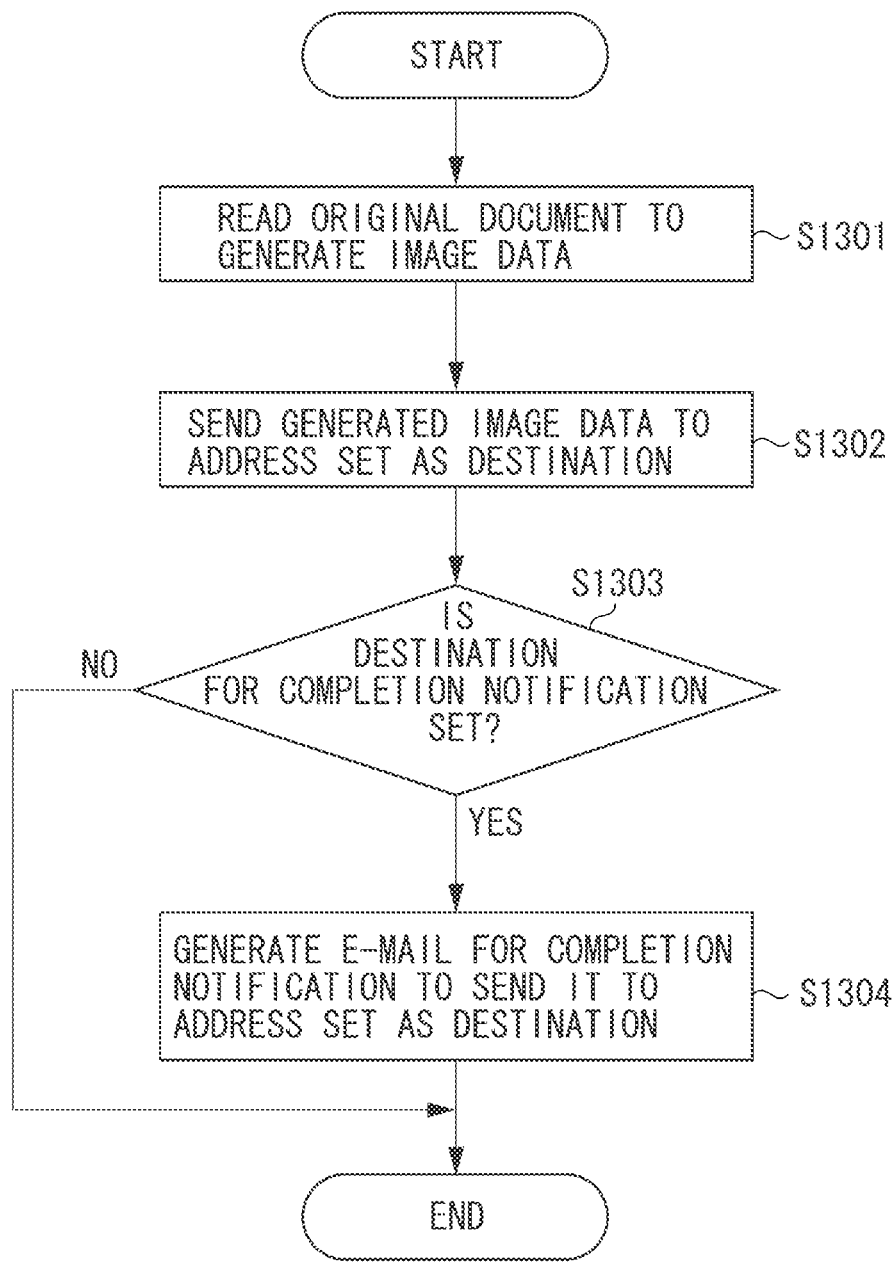

IMAGE PROCESSING APPARATUS, CONTROL METHOD THEREOF, AND STORAGE MEDIUM FOR SETTING A TRANSMISSION DESTINATION

BACKGROUND OF THE INVENTION

Field of the Invention

The present invention relates to an image processing apparatus configured to transmit image data, a control method thereof, and a storage medium.

Description of the Related Art

Conventionally, an image processing apparatus has been known that includes an operation key "send e-mail to myself" (as discussed in Japanese Patent Application Laid-Open No. 2006-101484). In Japanese Patent Application Laid-Open No. 2006-101484, when a user operates the operation key "send e-mail to myself", an e-mail address of the user operating the image processing apparatus is set as a destination of image data. This allows the user, who desires to transmit the image data to the e-mail address of the user, to save time for inputting the e-mail address of the user.

Further, in recent years, "completion notification" of an image processing apparatus has been known. The "completion notification" is a function of notifying via e-mail a predesignated destination of completion of a scan job or a copy job when the scan job or the copy job is completed. This allows the user to move to another place and confirm completion of the scan job or the copy job by the notification when the execution of the scan job or the copy job takes a long time.

In a case of transmitting image data as an attachment to an e-mail, the image data may accidentally be transmitted to an inappropriate destination, which may lead to information leakage. Further, a malicious user may intentionally try to transmit image data to an inappropriate destination.

To deal with the foregoing issues, a settable destination of an e-mail may be limited to a predetermined e-mail address. This prevents transmission of the e-mail to an e-mail address other than the predetermined e-mail address. Thus, accidental or intentional transmission of image data to an inappropriate destination can be prevented.

A specific method for the destination limitation may be, for example, a method in which a settable destination of an e-mail is limited to an e-mail address that is set using the operation key "send e-mail to myself". This prevents transmission of image data to an inappropriate destination and, at the same time, allows a user to transmit the image data to an e-mail address of the user.

However, application of the destination limitation described above to the "completion notification" decreases user convenience. In general, a "completion notification" contains less information than an ordinary e-mail with an attachment of image data does. Thus, the risk of information leakage is low. If, nonetheless, the notification to an address other than a predetermined e-mail address is limited, a user can receive the notification only at limited places. This decreases user convenience.

Especially if a settable destination of an e-mail is limited to an e-mail address that is set using the operation key "send e-mail to myself", it is not possible to send a completion notification to an e-mail address other than an e-mail address of a user operating the image processing apparatus. In this case, for example, when a user A is scanning and transmitting a considerable amount of documents, a completion notification of the scan job of the user A cannot be sent to a user B who is waiting to use the image processing apparatus after the user A's job is completed.

SUMMARY OF THE INVENTION

The present invention is directed to an image processing apparatus that limits a destination of an e-mail transmitted with an attachment of image data but does not limit a destination of an e-mail for making notification of completion of the e-mail transmission.

According to an aspect of the present invention, an image processing apparatus includes an acceptance unit configured to accept an input of user information, an acquisition unit configured to acquire an e-mail address of a user identified based on the user information accepted by the acceptance unit, a first setting unit configured to set a destination of a first e-mail transmitted with an attachment of image data, a second setting unit configured to set a destination of a second e-mail for making notification of completion of transmission of the first e-mail, and a control unit configured to perform control such that a destination of the first e-mail is restricted to the e-mail address acquired by the acquisition unit, but a destination of the second e-mail is not restricted to the e-mail address acquired by the acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a figure illustrating an operation screen of the MFP according to the exemplary embodiment.

FIG. 12 is a figure illustrating an operation screen of the MFP according to the exemplary embodiment.

FIG. 13 is a flow chart illustrating a transmission operation of the MFP according to the exemplary embodiment.

DESCRIPTION OF THE EMBODIMENTS

Various exemplary embodiments, features, and aspects of the invention will be described in detail below with reference to the drawings.

Figure 1:
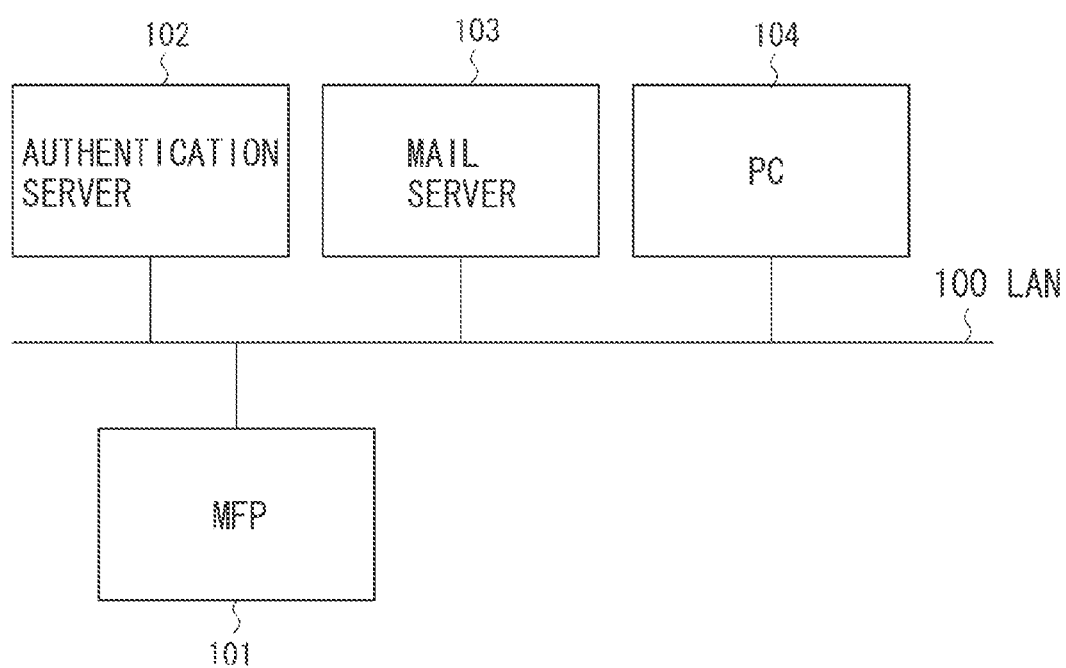
FIG. 1 is a view of an entire image processing system according to an exemplary embodiment of the present invention.

FIG. 1 is a view of an entire image processing system. On a local area network (LAN) 100, a multifunction peripheral (MFP) 101, an authentication server 102, a mail server 103, and a personal computer (PC) 104 are connected to be capable of communicating with one another. The MFP 101 is an example of an image processing apparatus. Although the present exemplary embodiment will describe the MFP as an example of an image processing apparatus, the image processing apparatus is not limited to the MFP, and any image processing apparatus with a function of transmitting image data can be used such as a single-function scanner apparatus. The authentication server 102 is an example of an authentication apparatus. Although the present exemplary embodiment describes a case in which the authentication server 102 and the MFP 101 are provided separately, an authentication function of the authentication server 102 may be incorporated in the MFP 101. The MFP 101 is capable of transmitting an e-mail with an attachment of image data or a completion notification e-mail, which will be described below, to the PC 104 via the mail server 103. Although a single PC 104 is described herein, a plurality of PCs 104 is connected on the LAN 100.

Figure 2:
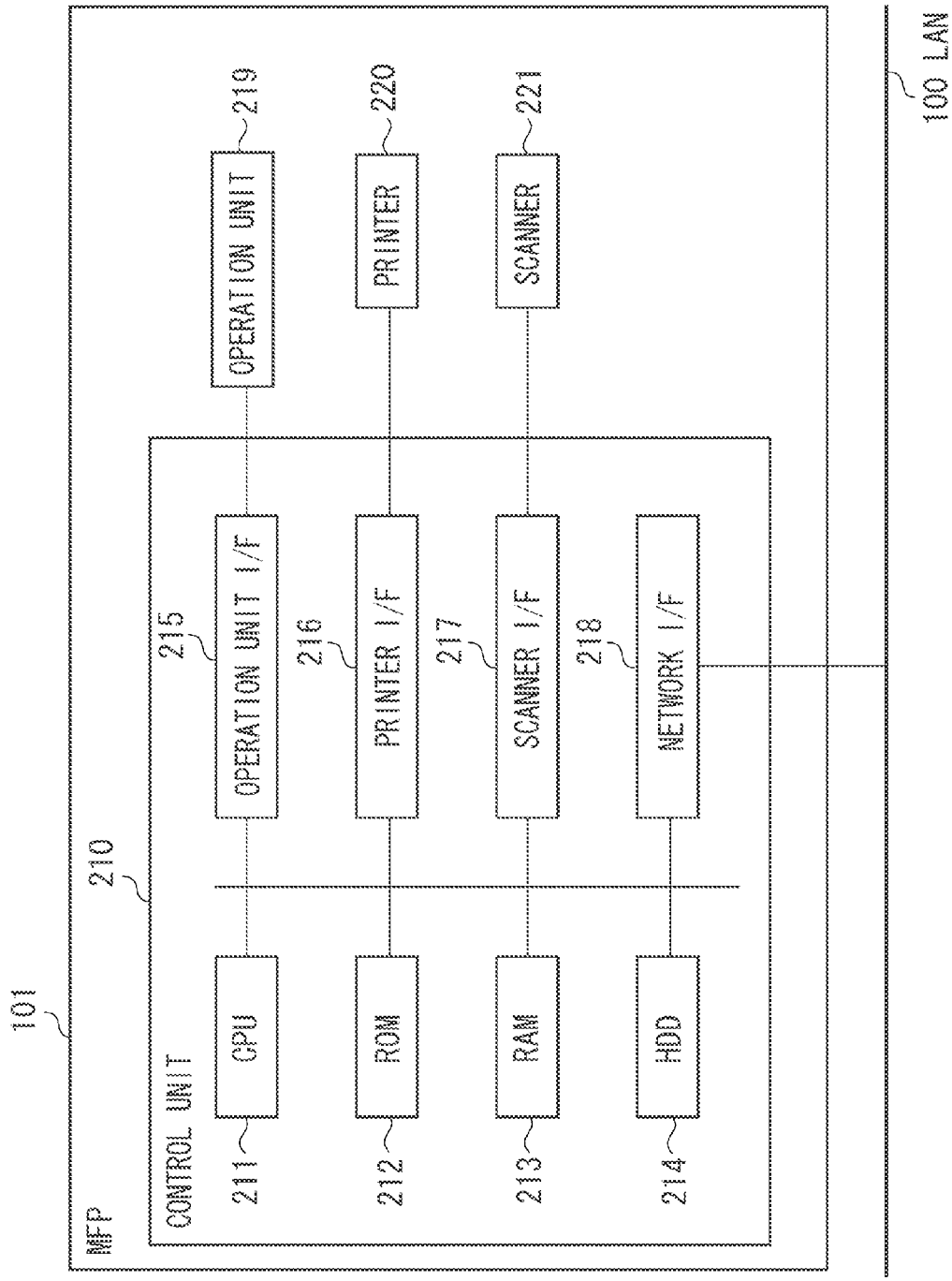
FIG. 2 is a block diagram illustrating a configuration of a multifunction peripheral (MFP) according to the exemplary embodiment.

FIG. 2 is a block diagram illustrating a configuration of the MFP 101. A control unit 210 including a central processing unit (CPU) 211 controls an entire operation of the MFP 101. The CPU 211 reads a control program stored in a read only memory (ROM) 212 to execute various controls such as a reading control and a transmission control. A random access memory (RAM) 213 is used as a temporary storage region such as a main memory and a work area of the CPU 211. The MFP 101 is configured such that a single CPU 211 uses a single memory (RAM 213 or hard disk drive (HDD) 214) to execute each processing illustrated in flow charts described below. The MFP 101 may have a different configuration. For example, a plurality of CPUs or a plurality of RAMs or HDDs may work together to execute each processing illustrated in the flow charts described below.

The HDD 214 stores image data and various programs. An operation unit interface (I/F) 215 connects an operation unit 219 to the control unit 210. The operation unit 219 includes a liquid crystal display unit having a touch panel function, a keyboard and the like, and the operation unit 219 functions as an acceptance unit configured to accept user instructions.

A printer I/F 216 connects a printer 220 to the control unit 210. Image data to be printed by the printer 220 is transferred from the control unit 210 via the printer I/F 216 and printed on a recording medium by the printer 220.

A scanner I/F 217 connects a scanner 221 to the control unit 210. The scanner 221 reads an image on an original document to generate image data (an image file) and inputs the image data to the control unit 210 via the scanner I/F 217. The MFP 101 is capable of performing file transmission or mail transmission of the image data generated by the scanner 221.

A network I/F 218 connects the control unit 210 (MFP 101) to the LAN 100. The network I/F 218 transmits various types of information to an external apparatus on the LAN 100. The network I/F 218 also receives various types of information from an external apparatus on the LAN 100. Further, the MFP 101 includes a modem, which is not illustrated, and is capable of sending and receiving facsimiles using telephone lines.

Figure 3:
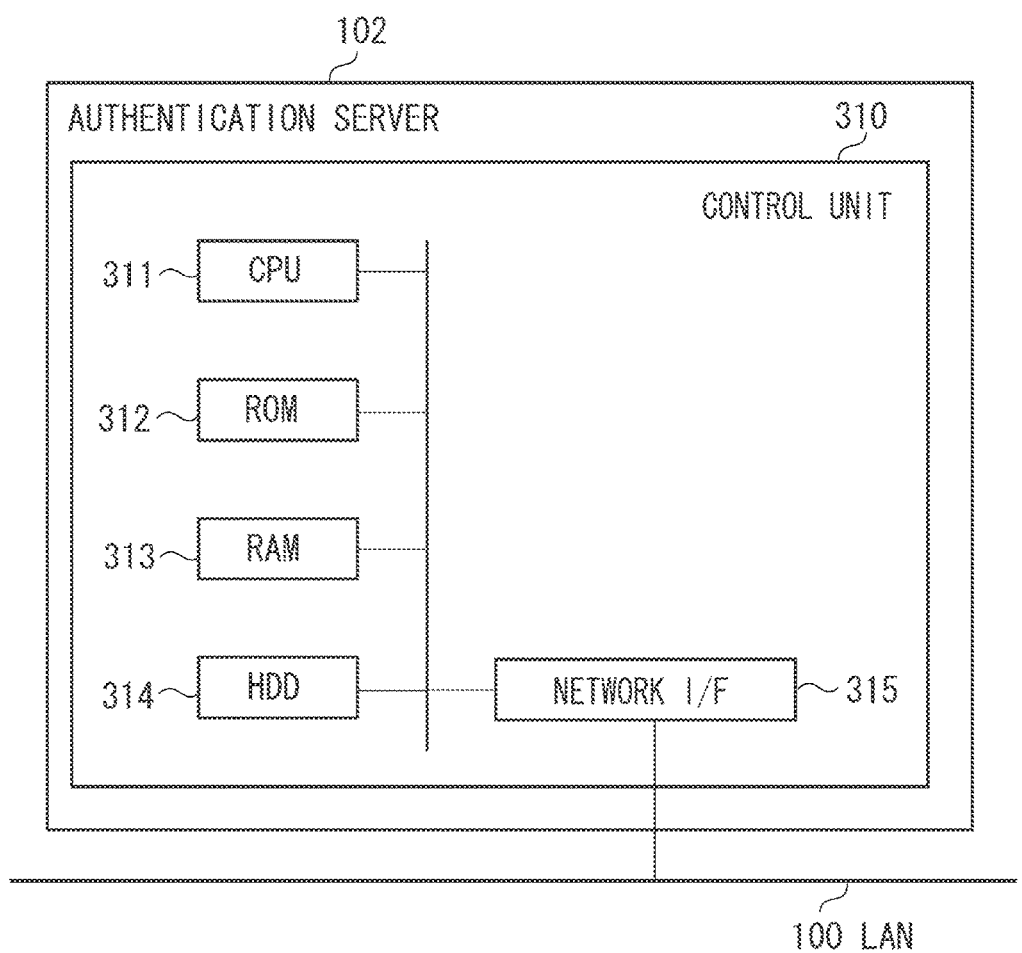
FIG. 3 is a block diagram illustrating a configuration of an authentication server according to the exemplary embodiment.

FIG. 3 is a block diagram illustrating a configuration of the authentication server 102. A control unit 310 including a CPU 311 controls an entire operation of the authentication server 102. The CPU 311 reads a control program stored in a ROM 312 to execute various types of control processing. A RAM 313 is used as a temporary storage region such as a main memory and a work area of the CPU 311. The authentication server 102 is configured such that a single CPU 311 uses a single memory (RAM 313 or HDD 314) to execute each processing illustrated in the flow charts described below. The authentication server 102 may have a different configuration. For example, a plurality of CPUs or a plurality of RAMs or HDDs may work together to execute each processing illustrated in the flow charts described below.

The HDD 314 stores image data and various programs. A network I/F 315 connects the control unit 310 (server 102) to the LAN 100. The network I/F 315 sends various types of information to another apparatus on the LAN 100 and receives various types of information from the other apparatus on the LAN 100.

Figure 4:
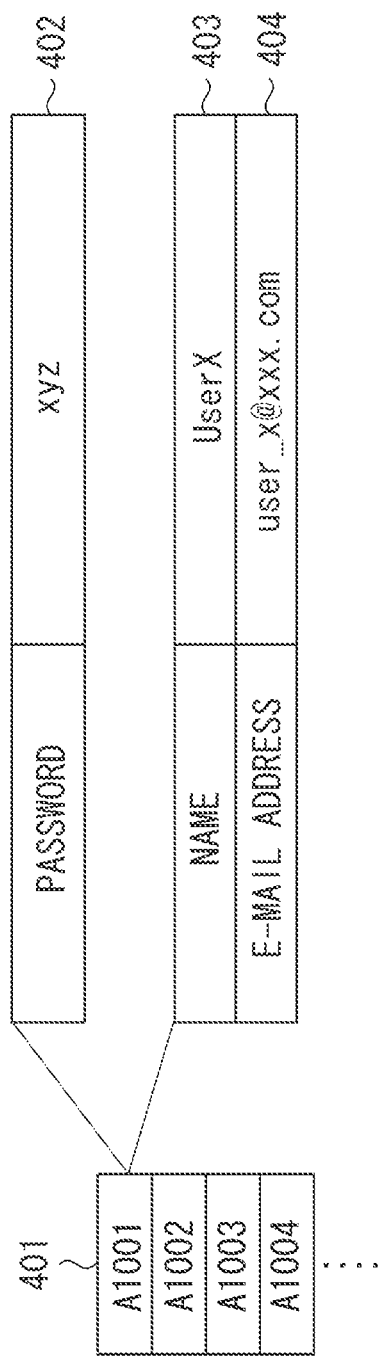
FIG. 4 is a figure illustrating information managed by the authentication server according to the exemplary embodiment.

FIG. 4 is a figure illustrating information managed by the authentication server 102 in the HDD 314. The authentication server 102 manages a domain including the image processing system illustrated in FIG. 1. The authentication server 102 also manages, for each user, information 401 and information 402, which are required for user authentication (identification), and information 403 and information 404 about users. The information 401 is a user name for unique user identification. In the present exemplary embodiment, the information 401 is, for example, an employee code of a company where the MFP 101 is provided, but the information 401 may be any other information.

FIG. 4 illustrates information of a user corresponding to a user name A1001. The user A1001 is required to input "A1001" as a user name and "xyz" as a password to start using the MFP 101. The user information (user name and password) input through the MFP 101 is sent to the authentication server 102. The authentication server 102 collates the user information sent from the MFP 101 with information managed as the information 401 and the information 402. If the user information matches the information managed by the MFP 101, then the authentication server 102 notifies the MFP 101 that the authentication is successful. On the other hand, if the user information does not match the information managed by the MFP 101, then the authentication server 102 notifies the MFP 101 that the authentication fails.

When the user authentication is successful, the MFP 101 is notified of the information 403 and the information 404, along with the information that authentication is successful. The information 403 indicates that the name of the user A1001 is "User X." The information 404 indicates an e-mail address of the user A1001. The user A1001 can receive an e-mail transmitted to an e-mail address managed as the information 404.

Figure 5:
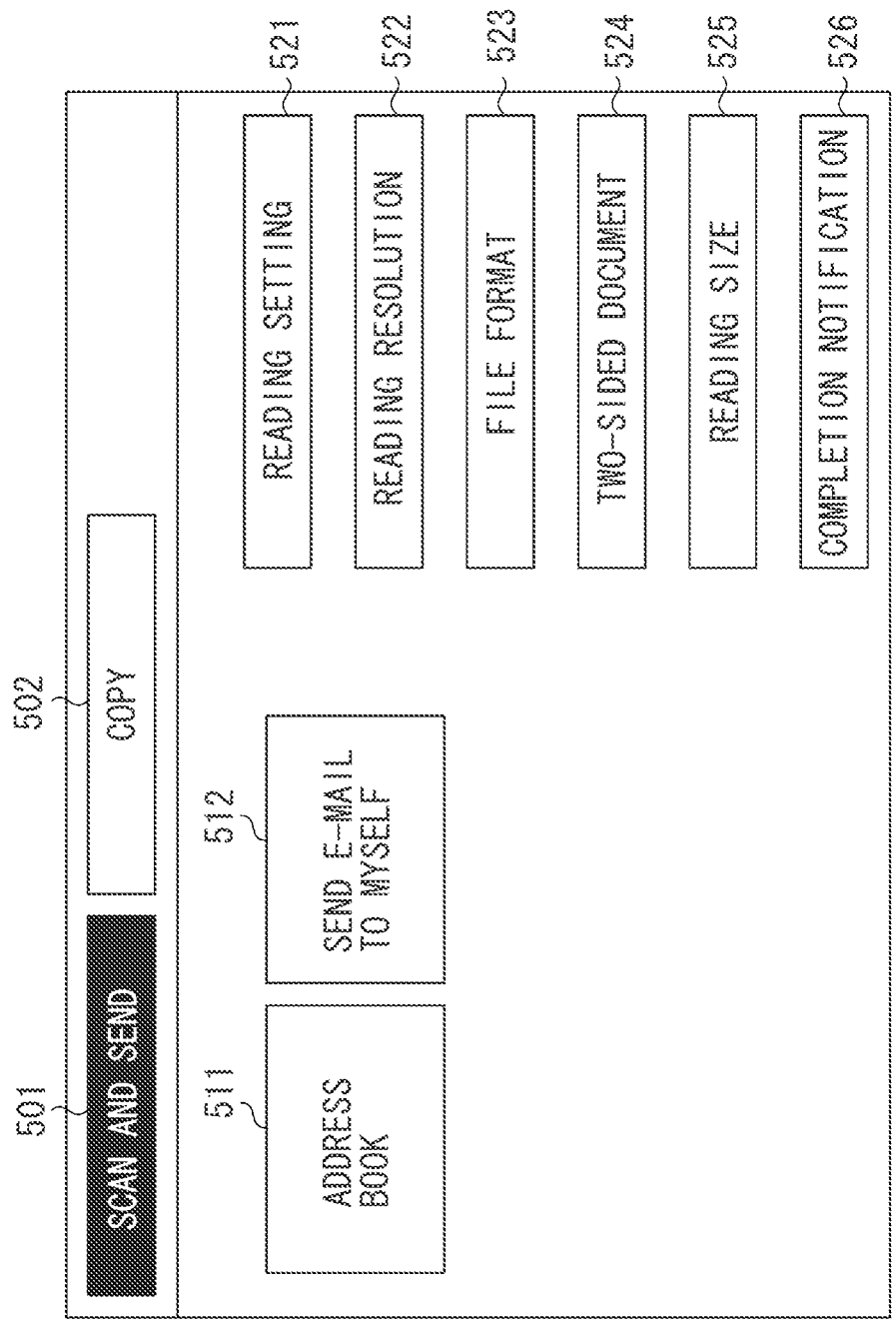
FIG. 5 is a figure illustrating an operation screen of the MFP according to the exemplary embodiment.

FIG. 5 illustrates an example of an operation screen displayed on the operation unit 219. On the screen illustrated in FIG. 5, the user can select a function by operating an operation key 501 or 502. FIG. 5 illustrates a state in which the operation key 501 is selected. It is to be noted that although FIG. 5 illustrates "scan and send" and "copy" as exemplary functions, the MFP 101 may have other functions.

The user having selected the operation key 501 can set a destination of image data to be transmitted by operating an operation key 511 or 512. When the user operates the operation key 511, contents of an address book stored in the HDD 214 are displayed. The user can refer to the registered contents of the address book to set a destination of the image data.

The operation key 512 is used to set an e-mail address of the user as a destination of image data. When the user operates the operation key 512, the e-mail address of the user is automatically set as a destination of the image data.

An operation key 521 is used to configure a reading setting such as color/monochrome. An operation key 522 is used to set a reading resolution. An operation key 523 is used to set a file format of image data to be transmitted. An operation key 524 is used to configure a one-sided/two-sided reading setting. An operation key 525 is used to set a reading size. An operation key 526 is used to set a destination of a completion notification, which will be described below.

FIG. 6 illustrates an example of an operation screen displayed on the operation unit 219. FIG. 6 is an address book screen displayed when the operation key 511 is pressed. Information 601 indicates the type of each address. In the MFP 101, e-mail addresses, facsimile addresses, and file addresses can be registered. A file indicates a method of transmitting image data by use of server message block (SMB) or file transfer protocol (FTP).

Information 602 indicates the name of each address. Information 603 indicates a detail of each address. When the type of address is e-mail, the address is to be an e-mail address. When the type of address is facsimile, the address is to be a telephone number (facsimile number). When the type of address is file, the address is to be a name of a host of a file server.

When the user selects at least one address from the address book and presses a determination (OK) button 604, the selected address is set as a destination of the image data. The following description is based on the premise that seven addresses of three types that are illustrated in FIG. 6 are registered in the MFP 101.

Figure 7:
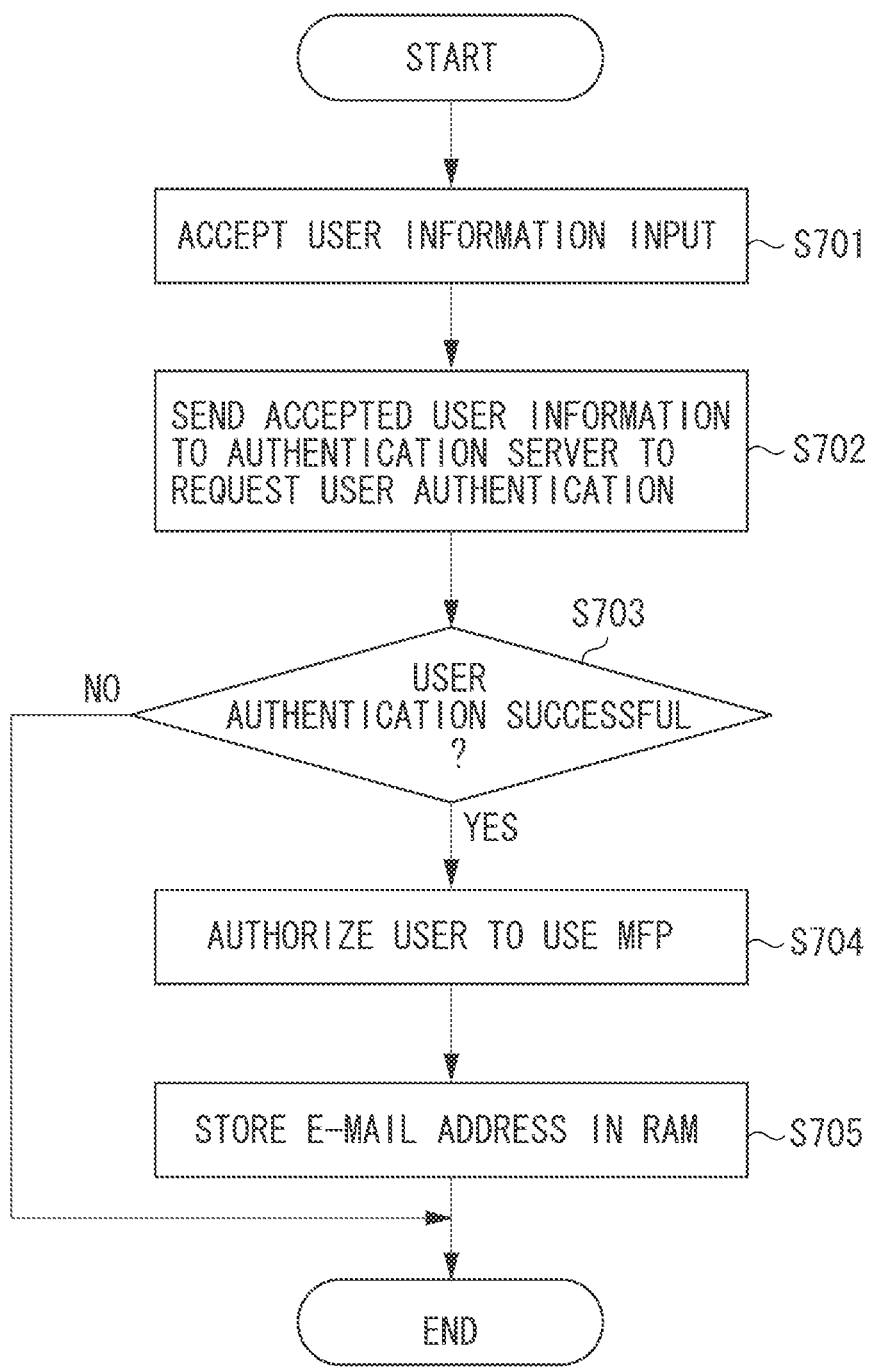
FIG. 7 is a flow chart illustrating a logging-in operation of the MFP according to the exemplary embodiment.

FIG. 7 is a flow chart illustrating a logging-in operation (a series of user operations to start using the MFP 101) in the MFP 101. The CPU 211 of the MFP 101 executes a control program stored in the HDD 214 to realize each processing (step) illustrated in the flow chart in FIG. 7.

In step S701, the CPU 211 accepts an input of user information (a user name and a password) via a screen displayed on the operation unit 219.

In step S702, the CPU 211 sends the user information accepted in step S701 to the authentication server 102 to request user authentication (the CPU 211 requests the authentication server 102 to determine whether the user can be authorized to use the MFP 101). In step S703, the CPU 211 determines whether a notification from the authentication server 102 indicates that the authentication is successful or not successful. If the notification is successful (YES in step S703), then the processing proceeds to step S704, and the CPU 211 authorizes the user to use the MFP 101. On the other hand, if the notification is not successful (NO in step S703), then the processing is terminated (or the processing returns to step S701 to re-display the screen for inputting user information).

In step S704, the CPU 211 authorizes the user to use the MFP 101. In step S705, the CPU 211 acquires an e-mail address (the information 404 illustrated in FIG. 4) notified by the authentication server 102 and stores the e-mail address in the RAM 213.

Figure 8:
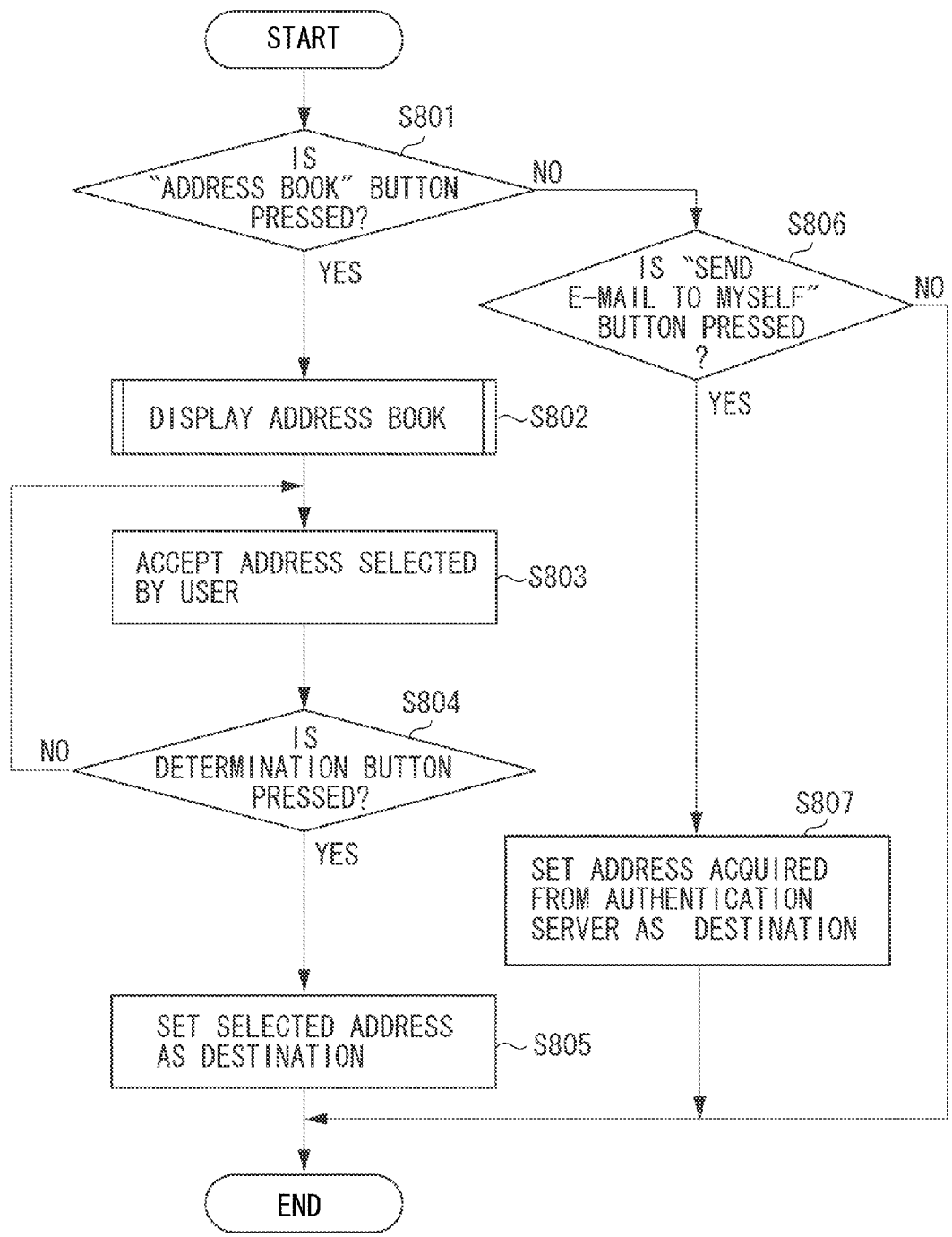
FIG. 8 is a flow chart illustrating a first destination setting operation of the MFP according to the exemplary embodiment.

FIG. 8 is a flow chart illustrating a first setting operation (an operation of setting a destination of a first e-mail) in the MFP 101. The CPU 211 of the MFP 101 executes a control program stored in the HDD 214 to realize each processing (step) illustrated in the flow chart in FIG. 8.

In step S801, the CPU 211 determines whether the user has operated the operation key 511 (whether the user has pressed the address book button). If the CPU 211 determines that the user has operated the operation key 511 (YES in step S801), then the processing proceeds to step S802. If the CPU 211 determines that the user has not operated the operation key 511 (NO in step S801), then the processing proceeds to step S806. In step S802, the CPU 211 displays the address book screen (FIG. 6). Detailed operations performed to display this screen will be described below with reference to FIG. 10.

In step S803, the CPU 211 accepts an address selected by the user via the address book screen. When the user touches a display area of the address book screen where a desired address is displayed, the display area is highlighted. In step S804, the CPU 211 determines whether the user has operated the determination (OK) button 604 with at least one address being selected. If the CPU 211 determines that the user has operated the determination button 604 with at least one address being selected (YES in step S804), then the processing proceeds to step S805. If the CPU 211 determines that the user has not operated the determination button 604 with at least one address being selected (NO in step S804), then the processing returns to step S803. In step S805, the address selected by the user is set as a destination of the image data. When the selected address is an e-mail address, the selected e-mail address is set as a destination of an e-mail to which the image data is to be attached.

In step S806, the CPU 211 determines whether the user has operated the operation key ("send e-mail to myself") 512. If the CPU 211 determines that the user has operated the operation key 512 (YES in step S806), then the processing proceeds to step S807. If the CPU 211 determines that the user has not operated the operation key 512 (NO in step S806), then the processing is terminated. In step S807, the CPU 211 sets the e-mail address (404 in FIG. 4) acquired from the authentication server 102 and stored in the RAM 213 as a destination of an e-mail to which the image data is to be attached. Use of the operation key ("send e-mail to myself") 512 eliminates the need to select the e-mail address of the user from a considerable number of addresses registered in the address book. This enables the user to send image data to the e-mail address of the user through an easy operation.

Figure 9:
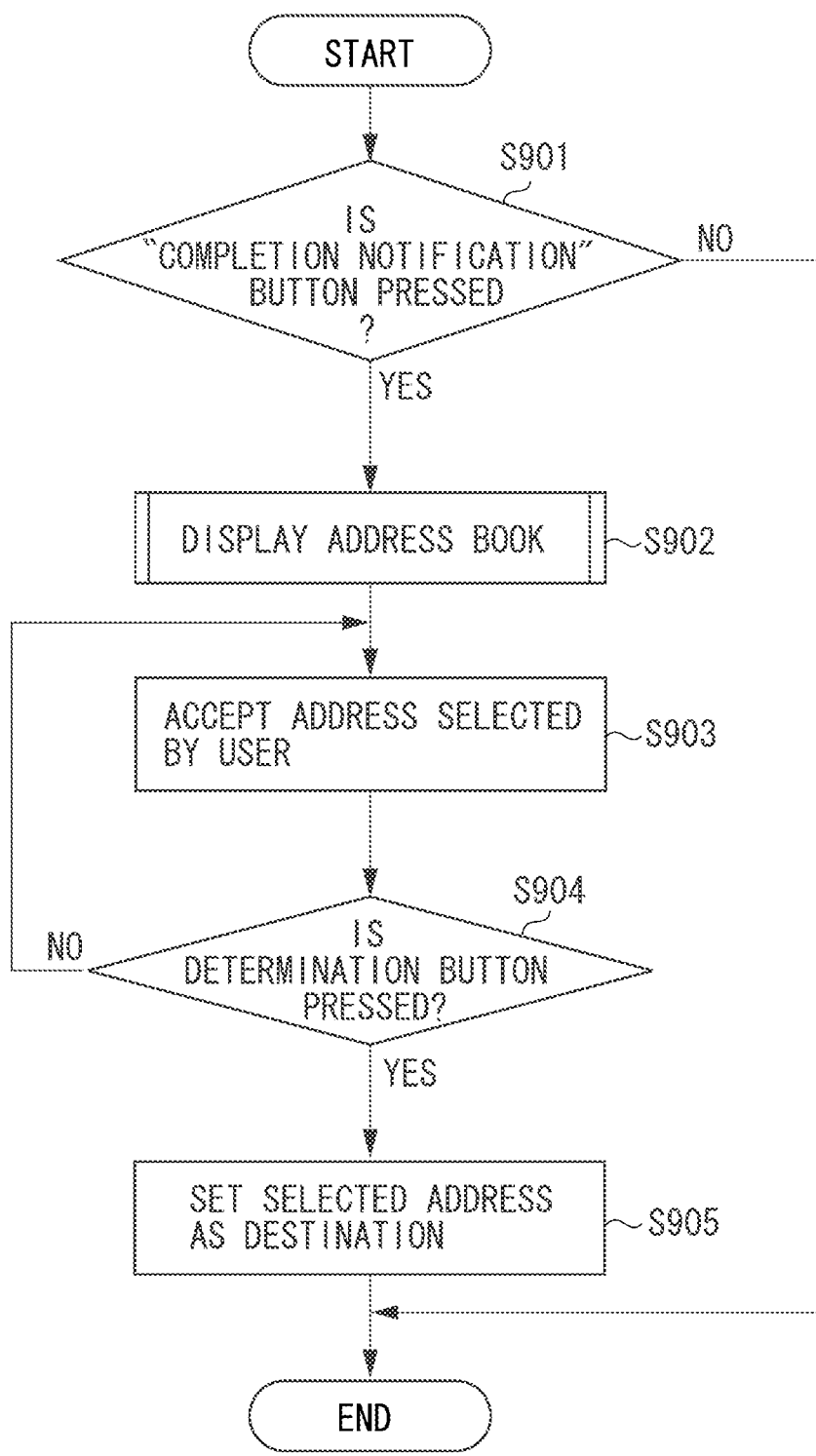
FIG. 9 is a flow chart illustrating a second destination setting operation of the MFP according to the exemplary embodiment.

FIG. 9 is a flow chart illustrating a second setting operation (an operation of setting a destination of a second e-mail) in the MFP 101. The CPU 211 of the MFP 101 executes a control program stored in the HDD 214 to realize each processing (step) illustrated in the flow chart in FIG. 9.

While the flow chart in FIG. 8 describes the case of setting a destination of image data (a destination of an e-mail to which the image data is to be attached), the flow chart in FIG. 9 describes a case of setting a destination of a completion notification e-mail. The completion notification is a function of notifying by e-mail a predesignated destination of completion of a scan job (corresponding to the operation key 501) or a copy job (corresponding to the operation key 502) in the MFP 101 when the scan job or the copy job is completed. This allows the user to move to another place and confirm completion of the scan job or the copy job by the notification when the execution of the scan job or the copy job takes a long time.

In step S901, the CPU 211 determines whether the user has operated the operation key 526 (whether the user has pressed the completion notification button). If the CPU 211 determines that the user has operated the operation key 526 (YES in step S901), then the processing proceeds to step S902. If the CPU 211 determines that the user has not operated the operation key 526 (NO in step S901), then the processing is terminated. In step S902, the CPU 211 displays an address book screen (illustrated in FIG. 12). Detailed operations performed to display this screen will be described below with reference to FIG. 10.

In step S903, the CPU 211 accepts an address selected by the user via the address book screen. When the user touches a display area of the address book screen where a desired address is displayed, the display area is highlighted. In step S904, the CPU 211 determines whether the user has operated the determination button 604 with at least one address being selected. If the CPU 211 determines that the user has operated the determination button 604 with at least one address being selected (YES in step S904), then the processing proceeds to step S905. If the CPU 211 determines that the user has not operated the determination button 604 with at least one address being selected (NO in step S904), then the processing returns to step S903. In step S905, the CPU 211 sets the address selected by the user as a destination of the completion notification e-mail.

Figure 10:
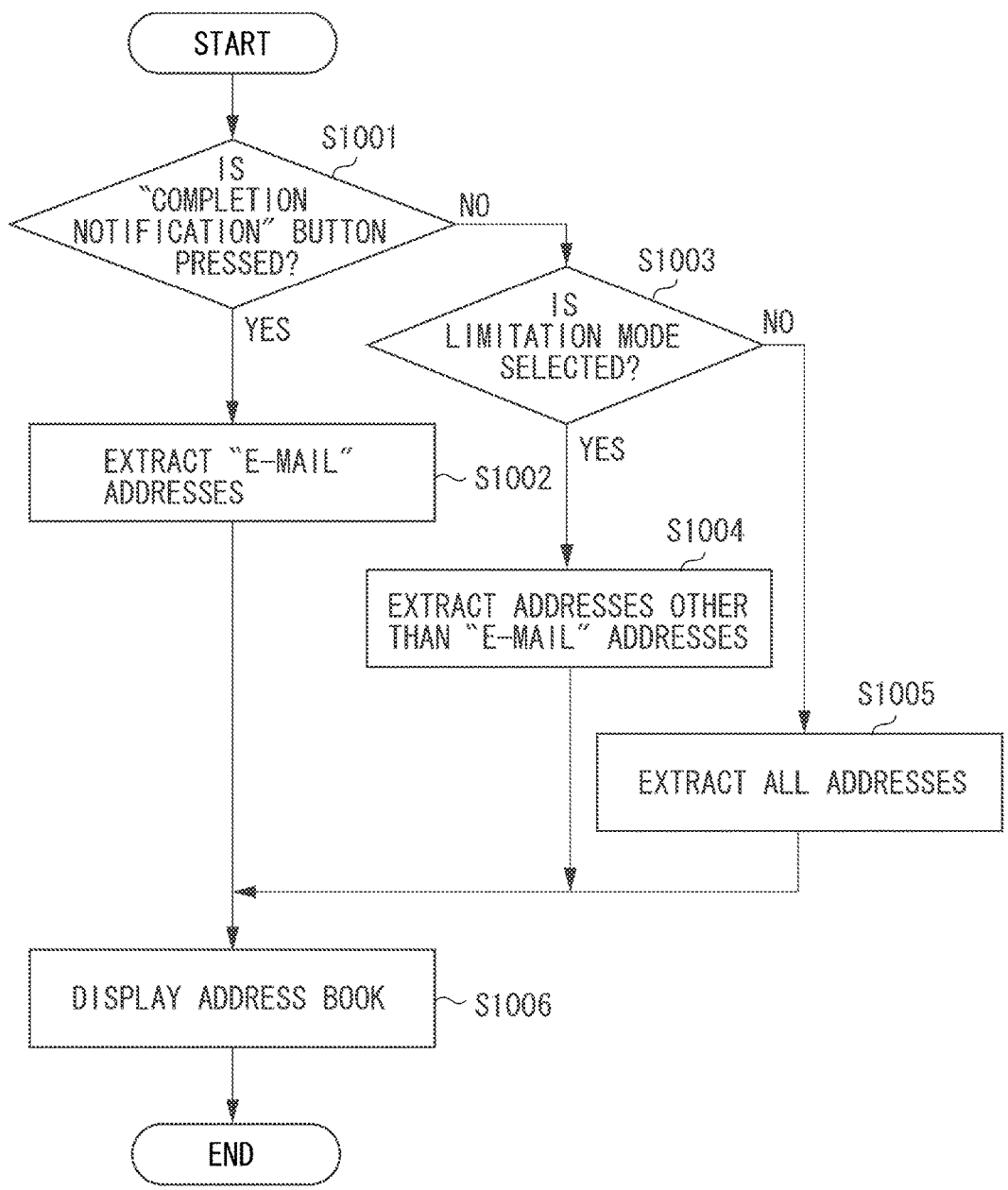
FIG. 10 is a flow chart illustrating an address book displaying operation of the MFP according to the exemplary embodiment.

FIG. 10 is a flow chart illustrating an address book displaying operation in the MFP 101. The flow chart in FIG. 10 illustrates detailed operations of step S802 in FIG. 8 and step S902 in FIG. 9. The CPU 211 of the MFP 101 executes a control program stored in the HDD 214 to realize each processing (step) illustrated in the flow chart in FIG. 10.

In step S1001, the CPU 211 determines whether the e-mail to be transmitted is for notification of completion of processing. Specifically, if the user has operated the operation key (address book) 511 to start the flow chart in FIG. 10, then the CPU 211 determines that the e-mail to be transmitted is not for notification of completion of processing (NO in step S1001), and the processing proceeds to step S1003.

In step S1003, the CPU 211 determines whether a limitation mode is selected. The limitation mode is a function of limiting a destination of an e-mail to an e-mail address of a user currently operating the MFP 101 when the e-mail is to be transmitted from the MFP 101 with an attachment of image data. Since general users can freely register addresses in the address book, there is a possibility that an e-mail address that is inappropriate as a destination of confidential information may be registered, such as an external e-mail address. Accidental or intentional transmission of confidential information to such an e-mail address registered as a destination may lead to information leakage. Accordingly, the MFP 101 includes the limitation mode in which a destination of an e-mail is limited to an e-mail address of a user currently operating the MFP 101, whereby transmission of confidential information to an inappropriate destination is prevented.

It is to be noted that although the limitation mode of the MFP 101 is only set for e-mails, the same limitation mode may also be set for facsimiles and files.

Figure 11:
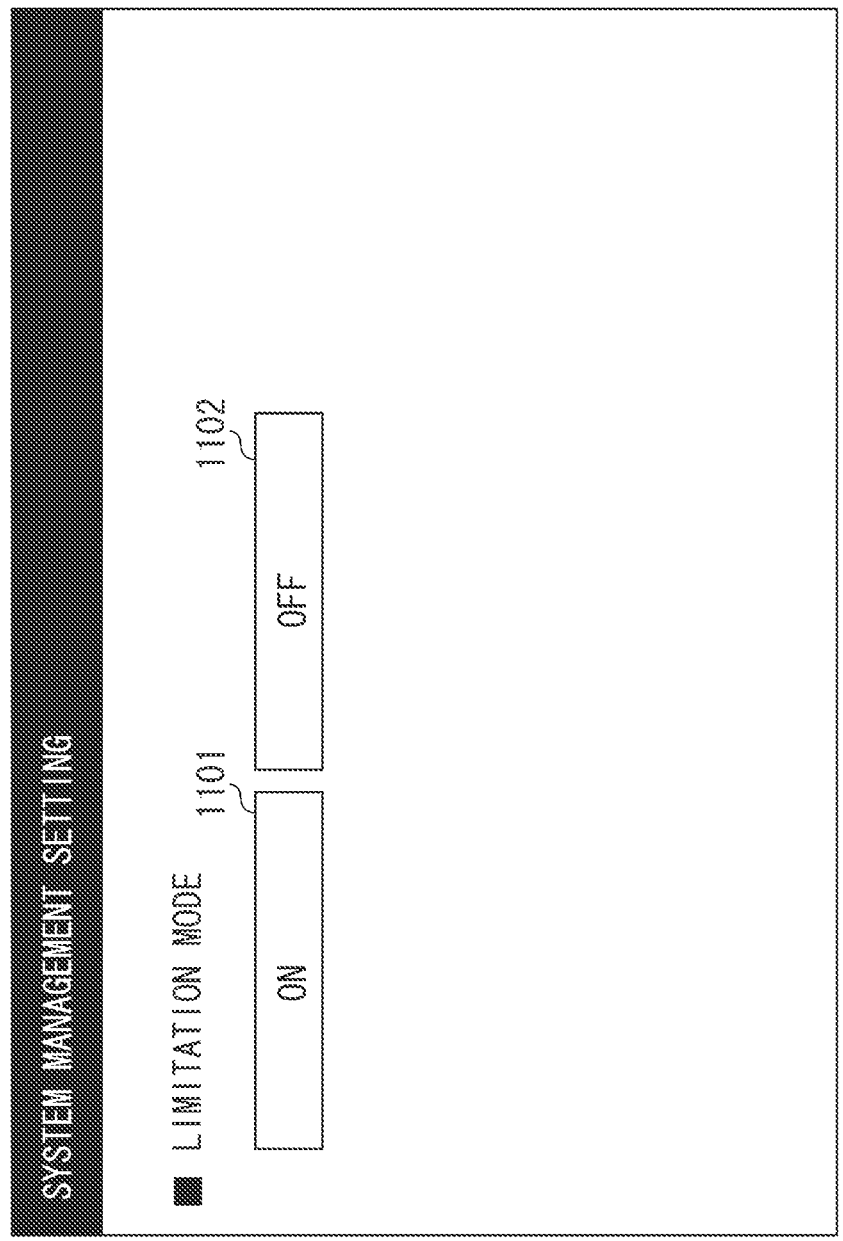
FIG. 11 is a figure illustrating an operation screen of the MFP according to the exemplary embodiment.

FIG. 11 illustrates an example of an operation screen displayed on the operation unit 219. Only an administrator can operate the screen illustrated in FIG. 11, and the screen illustrated in FIG. 11 is not displayed when a general user operates the MFP 101. The administrator can set the limitation mode via the screen illustrated in FIG. 11. When the administrator operates an operation key 1101, the limitation mode is set to "ON." When the limitation mode is set to "ON," transmission of an e-mail to a destination other than the destination set via the operation key 512 is prohibited. When the administrator operates an operation key 1102, the limitation mode is set to "OFF."

As a result of the determination in step S1003, if the CPU 211 determines that the limitation mode is "OFF" (NO in step S1003), then the processing proceeds to step S1005, and the CPU 211 extracts all addresses registered in the address book. On the other hand, if the CPU 211 determines that the limitation mode is "ON" (YES in step S1003), then the processing proceeds to step S1004, and the CPU 211 extracts addresses other than "e-mail" addresses among the addresses registered in the address book.

On the other hand, if the user has operated the operation key (completion notification) 526 to start the flow chart in FIG. 10 in step S1001, the CPU 211 determines that the e-mail to be transmitted is for notification of completion of processing (YES in step S1001), and the processing proceeds to step S1002. In step S1002, the CPU 211 extracts the "e-mail" addresses among the addresses registered in the address book.

In step S1006, the CPU 211 displays, on the address book screen, the addresses extracted in step S1002, S1004, or S1005. Because of the foregoing processing, when the e-mail to be transmitted is for notification of completion of processing, only the "e-mail" addresses are displayed among the addresses registered in the address book, and other addresses are not displayed. This is because the completion notification from the MFP 101 is made only through e-mail but not through any other forms (facsimile and file).

Further, when the e-mail to be transmitted is not for notification of completion of processing and the limitation mode is "ON," addresses other than the "e-mail" addresses are displayed among the addresses registered in the address book, and the "e-mail" addresses are not displayed. This is because when the limitation mode is "ON," none of the addresses registered in the address book is settable as a destination, and the user needs to set the e-mail address of the user via the operation key 512 if the user desires to transmit image data by e-mail.

Further, when the e-mail to be transmitted is not for notification of completion of processing and the limitation mode is "OFF," all addresses registered in the address book are displayed.

As described above, in the present exemplary embodiment, when the e-mail to be transmitted is not for notification of completion of processing, a destination of the e-mail is limited according to the selected limitation mode. On the other hand, when the e-mail to be transmitted is for notification of completion of processing, a destination of the e-mail is not limited. It is to be noted that if the CPU 211 determines in step S1001 that the e-mail to be transmitted is not for notification of completion of processing, the determination in step S1003 may be omitted and the processing may proceed to step S1004.

FIG. 12 illustrates an example of an operation screen displayed on the operation unit 219. FIG. 12 is an address book screen displayed when the user presses the operation key (completion notification) 526. In comparison with the screen in FIG. 6, the screen in FIG. 12 only displays the "e-mail" addresses and does not display other addresses. It is to be noted that instead of not displaying the addresses other than the "e-mail" addresses, the addresses other than the "e-mail" addresses may be displayed in such a state that the addresses other than the "e-mail" addresses cannot be selected.

FIG. 13 is a flow chart illustrating a transmission operation in the MFP 101. The flow chart in FIG. 13 is started when the user operates a start key, which is not illustrated, after a destination of image data is set. The CPU 211 of the MFP 101 executes a control program stored in the HDD 214 to realize each processing (steps) illustrated in the flow chart in FIG. 13.

In step S1301, the scanner 221 reads an image on an original document to generate image data. In step S1302, the image data generated in step S1301 is transmitted to the destination set in step S805 or S807 in FIG. 8. If the destination is an e-mail address, an e-mail with the image data attached to the e-mail is generated and transmitted via the mail server 103.

In step S1303, the CPU 211 determines whether a destination of the completion notification is set via the operation key 526. If a destination of the completion notification is set (YES in step S1303), then the processing proceeds to step S1304. If a destination of the completion notification is not set (NO in step S1303), then the processing is terminated. In step S1304, the CPU 211 generates an e-mail to be transmitted for notification of completion of the scan job (completion of transmission) and transmits the e-mail to the destination set in step S905 in FIG. 9. The completion notification e-mail includes information about the acceptance number, the time started, the number of pages, the name of transmitted file, and the destination, but the image data transmitted in step S1302 is not attached.

As described above, according to the present exemplary embodiment, when the limitation mode is set to "ON," a destination of an e-mail that is to be transmitted with an attachment of image data is limited to a predetermined e-mail address (an e-mail address of a user currently operating the MFP 101). In other words, a destination of the e-mail is restricted to the predetermined e-mail address. On the other hand, when an e-mail to be transmitted is a completion notification e-mail, even if the limitation mode is set to "ON," a destination of the e-mail is not limited to the predetermined e-mail address (an e-mail address of a user currently operating the MFP 101). In other words, a destination of the e-mail is not restricted the predetermined e-mail address. Accordingly, the risks of information leakage can be avoided while user convenience is maintained. Although the foregoing describes the case in which a destination of an e-mail with an attachment of image data is limited to an e-mail address of a user currently operating the MFP 101, other methods can be used to limit the destination. For example, a plurality of e-mail addresses that are settable as a destination of an e-mail with an attachment of image data may be registered in advance, and e-mail addresses that are settable when the limitation mode is "ON" may be limited to the registered e-mail addresses. Alternatively, a domain of e-mail addresses that are settable as a destination of an e-mail with an attachment of image data may be registered in advance, and e-mail addresses that are settable when the limitation mode is "ON" may be limited to addresses that include the domain.

Further, although the case in which image data generated by the scanner 221 is transmitted as an attachment to an e-mail is used in the foregoing description, the description also applies to a case in which image data stored in advance in the HDD 214 is transmitted. Specifically, when the limitation mode is set to "ON," a destination of an e-mail to be transmitted with an attachment of image data is limited to an e-mail address of a user currently operating the MFP 101.

Further, although the case in which a completion notification e-mail of a scan job is transmitted is used in the foregoing description, the description also applies to completion notification e-mails of other jobs (e.g., copy job). Specifically, even when the limitation mode is set to "ON," destinations of completion notification e-mails of other jobs are not limited to an e-mail address of a user currently operating the MFP 101.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-115758 filed May 21, 2012, which is hereby incorporated by reference herein in its entirety.

What is claimed is:

1. An image processing apparatus comprising:
   a scanner scanning a document and generating image data;
   a network interface;
   a storage;
   a display;
   a memory storing instructions; and
   a processor executing the instructions causing the image processing apparatus to:
      store an address book in the storage, wherein the address book includes e-mail addresses for e-mail transfer and a destination address for at least one of Server Message Block (SMB) and File Transfer Protocol (FTP); and
      perform a setting for inhibiting setting, as a transmission destination of data transmission of the image data generated by the scanner via the network interface, an e-mail address using the address book,
   wherein, if the setting for inhibiting setting, as the transmission destination of the data transmission, an e-mail address using the address book is not set, use of an e-mail address included in the address book is permitted as a transmission destination of the data transmission, wherein, even if the setting for inhibiting setting, as the transmission destination of the data transmission, an e-mail address using the address book is set, use of an e-mail address included in the address book is permitted as a transmission destination of a completion notification of the data transmission, and wherein, in a case where the setting for inhibiting setting, as the transmission destination of the data transmission, an e-mail address using the address book is set and a transmission destination of the image data generated by the scanner is set, e-mail addresses included in the address book are not displayed but the destination address included in the address book is displayed on the display.

2. The image processing apparatus according to claim 1, wherein image data is not attached to the second e-mail.

3. A method of controlling an image processing apparatus including a scanner scanning a document and generating image data, a network interface, a storage, and a display, the method comprising:

storing an address book in the storage, wherein the address book includes e-mail addresses for e-mail transfer and a destination address for at least one of Server Message Block (SMB) and File Transfer Protocol (FTP); and performing a setting for inhibiting setting, as a transmission destination of data transmission of the image data generated by the scanner via the network interface, an-email address using the address book, wherein, if the setting for inhibiting setting, as the transmission destination of the data transmission, an e-mail address using the address book is not set, use of an e-mail address included in the address book is permitted as a transmission destination of the data transmission, wherein, even if the setting for inhibiting setting, as the transmission destination of the data transmission, an e-mail address using the address book is set, use of an e-mail address included in the address book is permitted as a transmission destination of a completion notification of the data transmission, and wherein, in a case where the setting for inhibiting setting, as the transmission destination of the data transmission, an e-mail address using the address book is set and a transmission destination of the image data generated by the scanner is set, e-mail addresses included in the address book are not displayed but the destination address included in the address book is displayed on the display.

4. A non-transitory computer-readable storage medium storing a program including instructions, which when executed by a computer of an image processing apparatus including a scanner scanning a document and generating image data, a network interface, a storage, and a display, cause the image processing apparatus to execute a method comprising:

storing an address book in the storage, wherein the address book includes e-mail addresses for e-mail transfer and a destination address for at least one of Server Message Block (SMB) and File Transfer Protocol (FTP); and performing a setting for inhibiting setting, as a transmission destination of data transmission of the image data generated by the scanner via the network interface, an-email address using the address book, wherein, if the setting for inhibiting setting, as the transmission destination of the data transmission, an e-mail address using the address book is not set, use of an e-mail address included in the address book is permitted as a transmission destination of the data transmission, wherein, even if the setting for inhibiting setting, as the transmission destination of the data transmission, an e-mail address using the address book is set, use of an e-mail address included in the address book is permitted as a transmission destination of a completion notification of the data transmission, and wherein, in a case where the setting for inhibiting setting, as the transmission destination of the data transmission, an e-mail address using the address book is set and a transmission destination of the image data generated by the scanner is set, e-mail addresses included in the address book are not displayed but the destination address included in the address book is displayed on the display.

5. The image processing apparatus according to claim 1, further comprising:

an operation key for setting an e-mail address of a user who is logged in to the image processing apparatus as the transmission destination of the data transmission.

6. The image processing apparatus according to claim 5, wherein, in a case where the setting for inhibiting setting, as the transmission destination of the data transmission, an e-mail address using the address book is set, the e-mail address of the user who is logged in to the image processing apparatus is able to be set as the transmission destination of the data transmission in accordance with operation of the operation key.

7. The image processing apparatus according to claim 1, wherein the email addresses included in the address book are extracted and displayed so that a user can select an e-mail address from the extracted e-mail addresses as the destination of the completion notification, and the destination address included in the address book is not displayed for the destination of the completion notification.

* * * * *